US 7,831,574 B2

(12) United States Patent
Pareek et al.

(10) Patent No.: US 7,831,574 B2
(45) Date of Patent: Nov. 9, 2010

(54) APPARATUS AND METHOD FOR FORMING A HOMOGENOUS TRANSACTION DATA STORE FROM HETEROGENEOUS SOURCES

(75) Inventors: Alok Pareek, Brisbane, CA (US); Eric Ian Fish, Kentfield, CA (US); Andrei Lessiv, Redwood City, CA (US); Ali R. Kutay, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 439 days.

(21) Appl. No.: 11/747,848

(22) Filed: May 11, 2007

(65) Prior Publication Data

US 2007/0299885 A1    Dec. 27, 2007

Related U.S. Application Data

(60) Provisional application No. 60/799,806, filed on May 12, 2006.

(51) Int. Cl.
*G06F 7/00* (2006.01)
*G06F 9/44* (2006.01)

(52) U.S. Cl. .......................................... 707/703; 705/7
(58) Field of Classification Search .................. None
See application file for complete search history.

(56) References Cited

U.S. PATENT DOCUMENTS

| | | | |
|---|---|---|---|
| 5,438,508 A | | 8/1995 | Wyman |
| 6,032,147 A | * | 2/2000 | Williams et al. ............. 707/101 |
| 6,133,912 A | | 10/2000 | Montero |
| 6,341,285 B1 | * | 1/2002 | Blott et al. ..................... 707/8 |
| 6,460,069 B1 | | 10/2002 | Berlin et al. |
| 7,076,508 B2 | * | 7/2006 | Bourbonnais et al. ........ 707/202 |
| 2001/0037287 A1 | * | 11/2001 | Broadbent et al. ............ 705/38 |
| 2003/0083978 A1 | * | 5/2003 | Brouwer ....................... 705/37 |
| 2004/0030703 A1 | * | 2/2004 | Bourbonnais et al. ........ 707/100 |
| 2004/0111302 A1 | * | 6/2004 | Falk et al. ........................ 705/4 |
| 2006/0218206 A1 | * | 9/2006 | Bourbonnais et al. ........ 707/202 |
| 2007/0150384 A1 | * | 6/2007 | John et al. ..................... 705/30 |
| 2007/0288265 A1 | * | 12/2007 | Quinian et al. ................. 705/2 |

OTHER PUBLICATIONS

International Search Report and Written Opinion for International Application No. PCT/US07/68806, mailed Jul. 15, 2008, 7 pages.

* cited by examiner

*Primary Examiner*—Neveen Abel Jalil
*Assistant Examiner*—Tarek Chbouki
(74) *Attorney, Agent, or Firm*—Townsend and Townsend and Crew LLP

(57) ABSTRACT

A computer readable storage medium includes executable instructions to gather first committed transactional record from a first transaction log associated with a first data source. The first committed transactional record is converted to a homogeneous format to form a first homogeneous transactional record with a common transaction record header containing transactional context information from the first data source. A second committed transactional record is collected from a second transaction log associated with a second data source with a format different than the first data source. The second committed transactional record is changed to the homogeneous format to form a second homogeneous transactional record with a common transaction record header containing transactional context information from the second data source. The first homogeneous transactional record is combined with the second homogeneous transactional record to form a homogeneous transaction data store.

20 Claims, 5 Drawing Sheets

APPARATUS AND METHOD FOR FORMING A HOMOGENOUS TRANSACTION DATA STORE FROM HETEROGENEOUS SOURCES

CROSS-REFERENCE TO RELATED APPLICATION

This application claims the benefit of U.S. Provisional Application Ser. No. 60/799,806, entitled "Transaction Search and Query System with Transaction History Database" filed on May 12, 2006, the contents of which are hereby incorporated by reference in their entirety.

BRIEF DESCRIPTION OF THE INVENTION

This invention relates generally to digital data storage and retrieval. More particularly, this invention relates to a technique for forming a homogeneous transaction data store from heterogeneous sources to facilitate new forms of query and analysis.

BACKGROUND OF THE INVENTION

Database systems have traditionally allowed for functionality to store, retrieve, and manage vast amounts of information. Increasingly, large business organizations utilize a variety of database systems across multiple business units. Although there are numerous data storage transactional systems, the primary classification of these systems from a business standpoint is along operational or warehousing lines, with Online Transaction Processing (OLTP) systems oriented towards current operation of a business, and a data warehouse geared towards providing longer term, management oriented questions about the business. Large amounts of normalized data are moved from the OLTP system, de-normalized reordered, aggregated, transformed and reloaded into a data warehouse in a periodic manner so as to stay relatively current with the OLTP system.

These OLTP databases typically represent the current state of any operational system. Information is entered as data records/tuples via transactions that move the database from one consistent state to another; these systems are adept at keeping track of items (data) and relationships (dependencies, constraints) as they change, and facilitating new transactions. OLTP databases track detailed information for the purposes of current operations. OLTP databases do not generally maintain comprehensive historical information (typically only a few months worth). for reasons of speed and economy.

OLTP databases are not optimized to facilitate the following types of activities:

Comparing data and related activities between different periods
Running point-in-time queries
Tracing specific activity during a given time period
Showing evolution of data records
Identifying and quickly reacting to interesting transactions
Browsing any database table and row activity within a specific time period
Linking specific row changes to related transactions
Reapplying transactions selectively Data Warehouses are not optimized to facilitate the following tasks:

Providing all historical operational changes. For e.g. the most common approach to move data into a data warehouse is using ETL utilities. Such utilities may not capture all historical changes between two successive ETL passes since not all data source systems may have an indicator flag, or reliable timestamp of when a new change occurred.

Providing all records that constituted one transaction at a data source.

Providing, retaining transactional context such as all related operations that were part of the transaction at the exact commit point when the change(s) were made.

Providing a trace lineage to the data source origin especially with respect to) ,he posting of the original transaction at the data source.

Querying over data that has not been loaded into the warehouse.

Providing a non intrusive uniform automatic change data capture method to obtain data from original data sources.

Considering the increasing need for businesses to help address these tasks and challenges, it is desirable to provide a new type of data store that facilitates operations that are difficult or not possible to support with current OLTP databases and data warehouses.

SUMMARY OF THE INVENTION

The invention includes a first computer readable storage medium with executable instructions to gather a first committed transactional record from a first transaction log associated with a first data source. The first committed transactional record is converted to a homogeneous format to form a first homogeneous transactional record with a common transaction record header containing transactional context information from the first data source. A second committed transactional record is collected from a second transaction log associated with a second data source with a format different than the first data source. The second committed transactional record is changed to the homogeneous format to form a second homogeneous transactional record with a common transaction record header containing transactional context information from the second data source. The first homogeneous transactional record is combined with the second homogeneous transactional record to form a homogeneous transaction data store.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
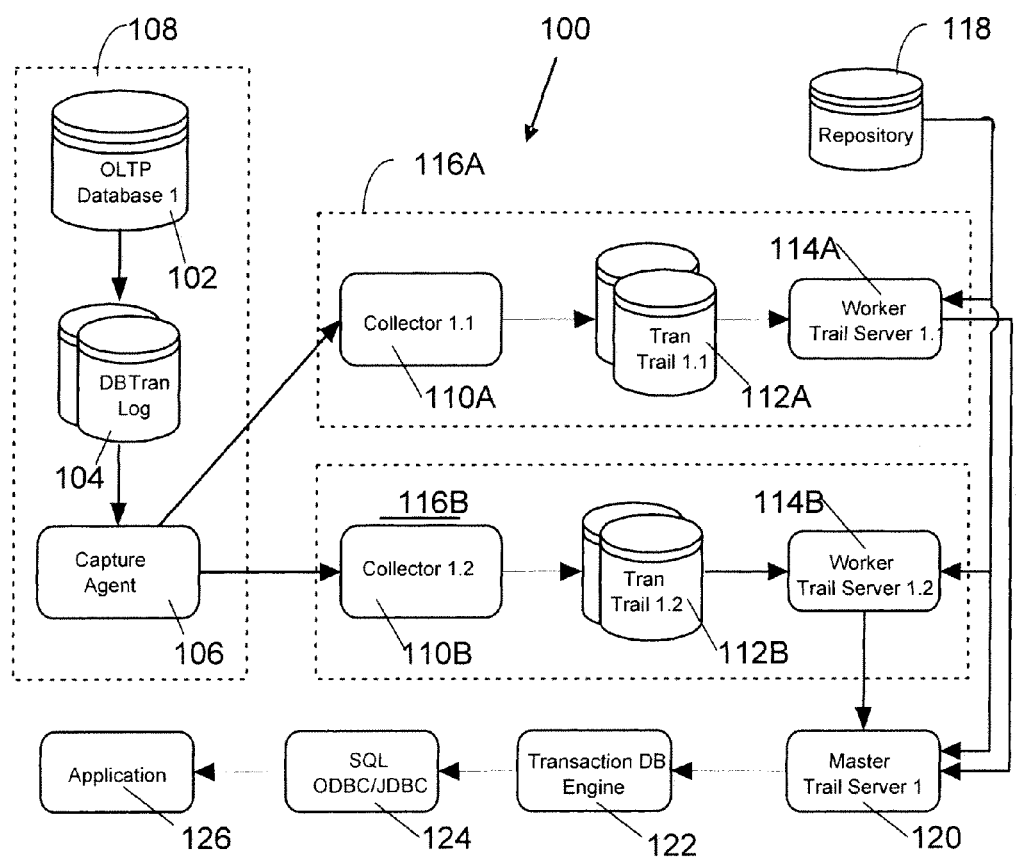
FIG. 1 illustrates a system configured in accordance with an embodiment of the invention.

The invention provides for the efficient construction, searching, and maintenance of a transaction data store (TDS). The TDS is a system that stores historical transactional records from heterogeneous data sources preserving transaction context from originating data sources in a common (homogeneous) transactional storage format in either a distributed or an integrated fashion. The system allows for querying transaction history over time periods where transactional data is valid. The invention has wide ranging applications in many areas like temporal access, data compliance, event processing, fraud detection, auditing, data warehousing, and business intelligence.

The transaction data store is created from an ordered collection of transactions that are placed into files. Each transaction is stored in a new common record format that is independent of its generating data source or machine format. The ordering within files is based on either the transaction commit point at the data source if one exists or the ordering is based on a TDS generated transaction commit time in the absence of a data source supplied transaction commit point. An efficient search method is provided to query the transactional data store system using a repository containing metadata about the ordered collections combined with standard database interfaces and query languages.

The transaction data store has the following additional advantages:

It is created with no or minimal application programming required at the data sources to capture transactional changes.

It executes queries quickly, potentially against a huge number of transactions.

It does not require a predefined data model to respond to historical queries.

It is highly adaptable to changing requirements.

It provides an economical solution compared with alternatives.

It provides an efficient, fast means to construct a data warehouse, or a temporal database.

One of the fundamental building blocks of the transaction data store system is the ability to automatically capture, format and store all or selected transaction changes from heterogeneous data sources. A product, such as the GoldenGate TDM platform, sold by GoldenGate Software, San Francisco, Calif., provides this capability already, however the aspects of the TDS that allows for efficient querying across the storage, providing lineage back to originating data sources, and presenting this information using a database engine abstraction layer or via a database system are new.

The TDS is different from a traditional warehouse in a variety of ways:

1. The main functional aim of a data warehouse is to provide summarized, aggregated, consolidated data with pre-programmed functionality for drill down, roll up etc. In contrast, the main aim of the TDS is to allow storage, and searching of all historical transactional data to return original transactional context in an on-going continuous manner.

2. A data warehouse design requires significant manual intervention especially for data acquisition. Additionally, preprocessing, transformations undertaken by a warehouse's data acquisition component from multiple heterogeneous data sources loses transaction context. A TDS provides a common, automatic data acquisition method to store transactions, and retains original transactional context. An example that illustrates the difference is the absence of a precise commit point associated with the transaction that created the record stored in the warehouse. The TDS always provides a commit point. Therefore, a TDS can be used for efficient creation of a data warehouse, but the reverse is not true.

3. A warehouse is periodically refreshed (e.g., with Extract-Transform-Load utilities) with data since the last acquisition point. A TDS automatically gets refreshed using the common data acquisition method.

4. A warehouse is typically implemented as a relational database (shared disk, shared nothing, etc.) and conforms to a pre-defined data model. A TDS is a distributed system spread over a collection of files containing ordered committed transactions.

5. The invention embodies a data store containing committed transactions in historical order. The data store utilizes either a flat file system or a relational database for storing committed transactions in a novel data-source independent transaction record format referred to as a Common Transaction Record (CTR). The CTR stores committed transactions in the commit time order as governed by the data source transaction log commit record order and offset (referred to herein as GDVN, or Global Database Version Number) of the originating source system.

6. The invention is further characterized by a built-in search system comprising a hierarchical structure with a single master server process and multiple worker server processes. The search system can be accessed either through a custom database engine or via one of many readily available relational database management engines via a set of SQL compliant application program interfaces (APIs).

The invention provides an enterprise infrastructure software platform to enable efficient creation, storage, search, and retrieval of the transaction history data across diverse database platforms and environments.

FIG. 1 illustrates a system 100 configured in accordance with an embodiment of the invention. The system 100 includes an OLTP database 102. The OLTP database 102 manages the production of data. Data is typically aged 30-180 days to enable optimal performance of the production system.

A database transaction log 104 is associated with the OLTP database 102. An OLTP database 102 typically has a database transaction log 104 to record all changes made to the database. Database transaction logs are primarily used for database recovery purposes, but are leveraged in accordance with the present invention to create a transaction data store.

In one embodiment of the invention, a capture agent 106 interfaces with the database transaction log 104. The capture agent includes executable instructions to read and decode the transaction log 104. A capture agent is typically implemented local to the database transaction log 104 for maximum read efficiency. In one embodiment, each capture agent handles one type of data source (e.g. Oracle, IBM. etc.) and one database instance, In one embodiment of the invention, the OLTP database 102, the transaction log 104 and the capture agent 106 are operative on one system 108 (e.g., one computer). In this system 108, a known OLTP database 102 and transaction log 104 are combined with a capture agent 106 of the invention. The invention is implemented using additional systems 108 (not shown) in order to produce transaction information from multiple data sources.

The capture agent 106 communicates with one or more collectors 110. Each collector 110 includes executable instructions to write data to a transaction trail 112 in accordance with information received from the capture agent 106, The transaction trail 112 contains transactional data homogenized into a universal data format (UDF) regardless of its source. The transaction trail is usually implemented as a flat file on disk. Although universal data formats are known, the current invention includes a common transaction record header to support the operations of the invention, as discussed below. The UDF and/or the common transaction record header may be implemented by the capture agent 106 and/or the collector 110A.

For parallelism, multiple transaction trails may exist, each of which stores a subset of information. Redundant trails may also exist for the purpose of high availability and to support better performance for simultaneous queries. Transaction trails may be combined into a transaction trail set (TTS). There may be more than one transaction trail per TTS in order to maximize query performance via parallel disk processing. A transactional trail set or a combination of transaction trail sets is referred to herein as a transaction data store.

Each transaction trail 112 interfaces with a worker trail server 114. The worker trail server 114 reads and returns filtered data from a specific transaction trail in a transaction trail set. A worker trail server-transaction trail pair may reside on a distinct node/disk pair to enable upstream filtering of data. In this configuration, only the desired data is transferred across the network. This enables multiple disks to be searched simultaneously.

The collector 110, transaction trail 112 and worker trail server 114 may be considered as part of a single system 116, with multiple instances, such as 116A, 116B, etc. Each system 116 may be implemented in a single machine or across many coordinated machines. It is the operations of the invention that are significant, not where or how they are implemented.

FIG. 1 also illustrates a repository 118. The repository 118 contains metadata for the contents of the transaction trails. This metadata is accessed by the worker trail server 114 and the master trail server 120 to decode and analyze data.

The master trail server 120 coordinates search activity across all transaction trails in a transaction trail set. A master trail server API may be used to specify transaction search and query parameters. The master trail server employs slave worker trail server processes to read and filter data from each individual transaction trail.

The master trail server 120 may communicate with a transaction database engine 122. The transaction database engine 122 is a database or database abstraction layer that enables SQL access to the underlying transactions physically stored in the transaction trail set. This engine interprets SQL requests and passes associated search parameters lo the master trail server 120. The engine 122 also receives filtered data from the master trail server 120 and translates into a standard format. The engine 122 may include a pre-defined schema for accessing transactional items.

FIG. 1 also illustrates an application 126 and an interface layer 124. The interface layer 124 is configured to support SQL and standard gateway APIs for database query and execution.

Typically, the components of FIG. 1 are distributed across a network. Any number of configurations are possible. Again, it is the operations of the invention their are significant, not the particular location and manner in which those operations are implemented.

Now that an overview of the components of the invention has been provided, attention turns to additional details regarding the invention and individual components associated with the invention.

As previously indicated, a capture agent 106 extracts transactional changes from a database transaction log 104. The invention is typically implemented with multiple capture agents 106 operating on multiple transaction logs 104. The capture agent 106 may be implemented using the EXTRACT or CAPTURE processes available from GoldenGate Software, San Francisco, Calif. Transaction trails may be created and maintained by Capture Agents (CAs). Each CA typically reads a database transaction log, translates the database vendor's proprietary format into a universal data format (UDF), and appends the selected committed operations to one or more specified transaction trails 112 via a collector 110. Commonly, system 108 is a source system while system 116 is a destination system. The UDF may be the UDF commercially available through GoldenGate Software. This UDF is currently used for transactional replication purposes to provide heterogeneity of supported data sources. This known UDF is enhanced for the purpose of the current invention by adding a common transaction record (CTR) and trail header records in order to support the functionality of the transaction data store (i.e., one or more transaction trail sets)

For high performance reading (and sometimes due to API limitations), capture agents are typically run on the same system as the source database instance. The transaction trails created by capture agents can reside anywhere, including the same or different systems.

As an alternative to directly reading and distributing data from transaction logs, data can be captured first from the log into a transaction trail. In a second operation, the data is distributed across a secondary set of trails by a data extraction process. This type of configuration may be optimal, for example, when capture of log data is already being performed for other purposes (such as replication). In these scenarios, capture against the logs can he performed once into a transaction trail, and then a data extraction process can be used by each of the replication and transaction store systems to read that trail independently and generate a copy of the trail elsewhere. Data extraction mechanisms are commercially available from GoldenGate Software, San Francisco, Calif.

Transaction trails can also be produced by other sources, such as through the GoldenGate Vendor Access Module (VAM) API. In this configuration, changes are not automatically captured from a log or trail, but are generated by user code (e.g., from any conceivable source, such as a JMS queue, XML, EDI, etc.). The eventual transaction data store (TDS) is dependent for certain metadata (e.g., ordering via GDVN) from a generating data source. For data sources where this information is insufficient., custom application programming may be used to generate the metadata and pass it via the VAM API.

The invention utilizes a common transaction record header associated with the UDF. The transaction record header is a data structure within a transaction trail that is appended to an existing UDF header, such as the UDF header currently implemented by GoldenGate. For example, a transaction represented in the database transaction log from a database vendor like Oracle running on a Sun Solaris operating system, or in a transaction log generated by an IBM DB2 database running on an AIX operating system is stored in the same common format in the transaction trail generated by the capture agent 106. The common transaction record header allows a query to be submitted to the TDS. One implementation of a common transaction record header is shown in FIG. 2.

Figure 2:
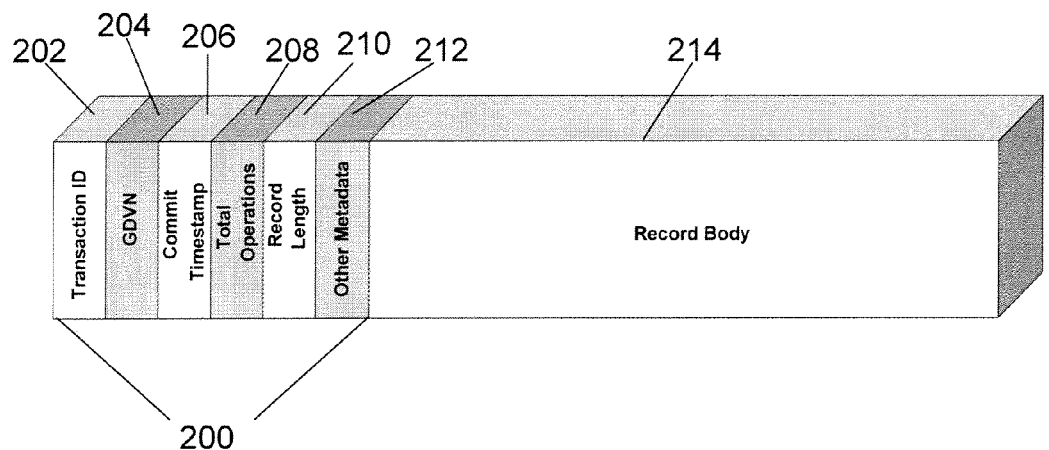
FIG. 2 illustrates a common transaction record header utilized in accordance with an embodiment of the invention.

FIG. 2 illustrates a transaction record header 200 with components 202-212. The first component is a transaction identification originating from the data source 202. The next component is the order and offset of a commit record from the originating data source transaction log (GDVN) 204. The next component is the original time of commit posting at the originating data source 206. The next component is the number of data source operations within the common transaction record 208. The next component is the number of bytes occupied by the common transaction record on disk 210. Additional metadata 212 may also be provided.

A record body 214 follows the transaction record header 200. The transaction record body 214 comprises row operation type (inserts, updates, and deletes). values of any changed columns, and the primary key values that uniquely identify a record. In addition, the row operations involved in a database transaction may be augmented by other metadata (e.g. the table name). Row operations are stored in commit order: all transaction operations are therefore stored consecutively in the trail.

A transaction trail 112 may be implemented as a sequence of files that contain committed records including data, and transactional context in the order of their commit at the data source. Records are not interleaved in the transaction trail, as they are in most database transaction logs. For example, a single capture agent could generate transaction trails on host HST1 with the file name prefix/dirpath/aa, and a different transaction trail on host HST2, with the file name prefix of/dirpath/bb. The sequence number is generated and appended to each file name prefix to form the individual file names.

Transaction data is organized in time sequence. More precisely, data is appended to transaction trails as it is committed in the data source. As a result, queries that search all transaction data in a specific time range or in time sequence are ideally suited for the transaction data store.

Figure 3:
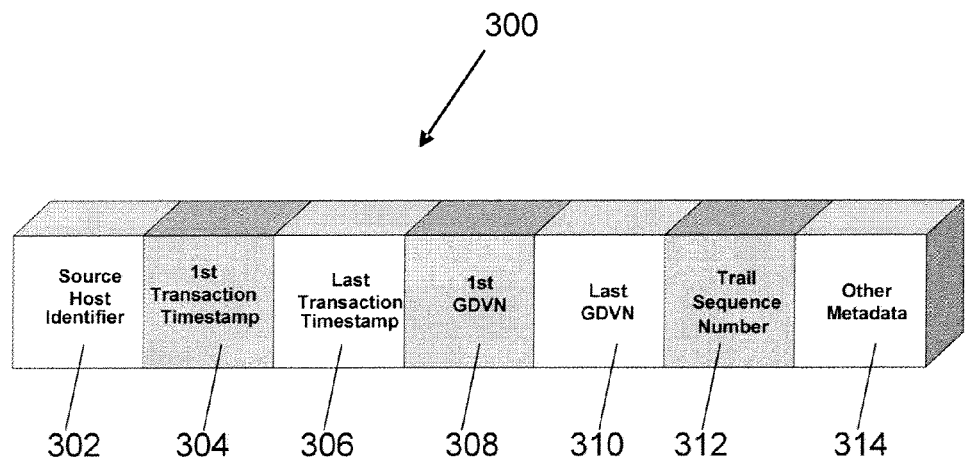
FIG. 3 illustrates a transaction trail header utilized in accordance with an embodiment of the invention.

In one embodiment, each transaction trail has a new trail header 300 of the type shown in FIG. 3. A source host identifier 302 indicates all elements that uniquely identify a data source. For example, in the case where the data source is an Oracle database, the data structure element would be the database identifier, database name, and database incarnation. A first transaction time stamp 304 and last transaction time stamp 306 specify a timestamp-range representing the time span of all committed records within the trail. A first GDVN 308 and last GDVN 310 specify the first and last committed transactions within the trail. A trail sequence number 312 is also provided. In addition, supplemental metadata 314 may also be provided.

These trail header elements allow for efficient query processing based on timestamp ranges across the trails and trail sets since only the headers need be examined to qualify the trail for transactional retrieval purposes. As trails are generated, coordination is done to ensure that the begin timestamp of the current trail that is being written to matches the terminating timestamp in the trail header of the previous trail that the capture agent 106 just finished writing. A specified value may be used as a terminating timestamp to indicate that the trail is currently being written into.

A transaction trail set (TTS) is one or more transaction trails that collectively composes a record of a specific data source's transactions. The TTS can consequently provide a basis on which to perform transaction query processing. Users issue transaction query commands to return specific pieces of transactional data, typically over a given time period.

A generated transaction sequence number (GTSN) is GoldenGate's implementation of a GDVN. It is used for marker records that are special records that are written to a trail for various reasons (e.g., generation of a heartbeat during idle activity to introduce a system generated marker). When a marker record needs to be generated, a CTR record is generated with a GTSN as a GDVN, and a commit timestamp using a current timestamp.

One implementation of the GTSN comprises the 32 bit C timestamp plus a 32 bit transaction sequence number. The C time is generated at capture agent startup, and the sequence number increments for each transaction processed by the agent. Using a startup timestamp enables one to avoid check pointing the sequence number value (which only has to increase and does not have to increment by exactly one each time). If the sequence number reaches the maximum 32 bits, a new timestamp is generated and the sequence returns to zero.

There are two main purposes of the GTSN: the first, to be able to order markers across a TTS and second to provide a mechanism for ordering transactions from a data source that does not have its own mechanism of generating a GDVN.

The capture agent 106 may be configured to implement a round-robin heartbeat mechanism. The heartbeat is a special record output to each TT periodically that contains the current timestamp and a GTSN. The heartbeat is a simple marker appended to each TT in the TTS that indicates the last GTSN processed by the capture agent, Generation of a GTSN heartbeat is a synchronized event within a transaction trail set, i.e., whenever a heartbeat is generated all TT buffers are flushed. The main reason for a heartbeat is to ensure that timestamp/GDVN progress can be returned for querying purposes. This is further described below.

Figure 4:
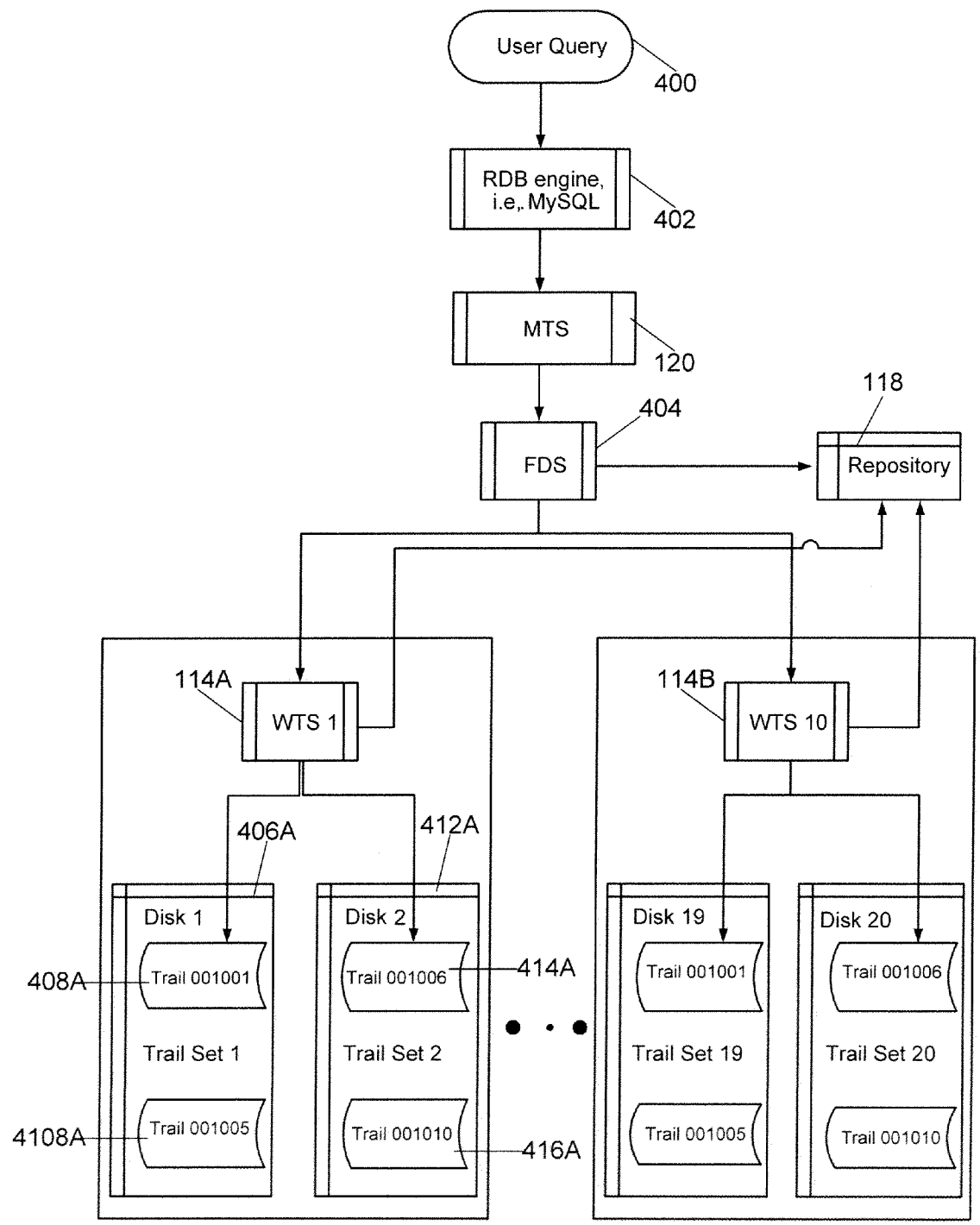
FIG. 4 illustrates a system to exploit processing parallelism in accordance with an embodiment of the invention.

FIG. 4 illustrates an example of trail server search and query processing performed in accordance with an embodiment of the invention. A user submits a query 400. For example, the query may specify to find all transactions from a company's HR database (Data source HR) in the first quarter of the last year where Salary value was incremented by 100%. The query may be submitted to the system using standard SQL or via a graphical user interface 402. The system's user interface could be implemented using a relational database engine, e.g., a readily available off-the-shelf products, such as, open source MySQL. The system will provide this plug in capability by having master trail server 120 APIs conforming to SQL standards. The query is then passed to the MTS 120, which in turn uses an internal filter data specification (FDS) 404 to extract the data source information and transaction timestamp ranges from the query. The MTS 120 further uses this information to find in the repository the specific trail set which holds the data in that range. Once the trail set containing the data range is identified the request is directed to the specific worker trail server (WTS) 114.

The WTS 114 searches the trail(s) within a specified trail set. For example, FIG. 4 illustrates WTS 114A with a first disk 406A containing trail set 1 between trail locations 408A and 410A. Similarly, a second disk 412A contains trail set 2 between trail locations 414A and 416A. The WTS 114A returns the data to MTS 120, which in turn passes it back to the front end database engine. The database engine then returns the search result to the user as a standard SQL result set.

The Master Trail Server (MTS) 120 is the coordinating process for retrieving specified transaction data. An API call into the master trail server indicates which data to return back to the client application based on filters specified by FDS 404. The FDS 404 may include a subset of tables, rows and columns. In addition, the FDS 404 may include one or more specific time ranges in which to search.

The MTS 120 starts a dedicated Worker Trail Server (WTS) 114 process for each TT in the TTS (an example implementation is using the TCP/IP mechanisms of the current GoldenGate Manager process). Each WTS 114 runs locally to its corresponding TT. The MTS 120 passes each WTS the FDS specification. When possible, the MTS only starts a WTS for a given TT once per session (rather than once per query).

At the request of the MTS 120, each WTS 114 reads its TT for transaction change records and applies the specified filters. The WTS 114 first identifies the files within its TT that correspond with the search begin time. Establishing the proper file can be done in a variety of ways, including reading the first transaction in each file, searching trail headers for timestamp and GDVN ranges, using a repository file or table that stores trail header metadata, etc.

Once positioned properly, the WTS 114 returns any transaction data to the MTS 120 that passed the filters, along with the corresponding GDVNs and timestamp. Because filtering is done before transmitting data, queries that select a subset of data from the TT can conserve large amounts of bandwidth (otherwise, all unfiltered data would be transmitted to the MTS 120 for filter analysis; even over a LANE, this can be far more time-consuming). For optimal performance, a WTS 114 should wait until one of the following occurs before returning data to the MTS 120:

an "end-of-trail" condition is reached;
the time boundary specified in the FDS is passed;
for search across a transaction trail, the locations of each TT and WTS, as well as their associations within the larger TTS;
no more memory is available to hold transactions.

In addition, the WTS 114 returns the minimum and maximum GDVNs encountered thus far during TT reading. The WTS 114 also returns information about how many transactions, records and bytes have actually been processed (including the filtered out items). The next GDVN to start processing is returned to the MTS 120.

Attention now turns to sorting WTS records in the proper order in the MTS 120. Each trail contains transactional records in GDVN order. A merge may be required based on the GDVN across transactional returned records. As the MTS receives blocks of filtered data returned from the individual WTS processes, it de-blocks the data within each returned block (effectively creating a queue of transaction records to be processed per WTS). The MTS 120 then selects the next transaction, for example using the following technique.

First the NITS 120 evaluates the current GDVN for each WTS 114. This is the GDVN of the next unprocessed transaction in the WTS queue, or if no transactions are available, the maximum GDVN encountered in the last message returned from the WTS.

The MTS 120 selects the transaction across all WTS queues with the lowest GDVN. However, if no additional transactions can be selected because the current GDVN for a given WTS is less than the GDVN of each of the other WTS processes, and there are no more available transactions, then the next block of records mist be fetched from that WTS, and the evaluation process starts as before. In addition, as described above, heartbeat records are periodically generated by the capture agent 106. This mechanism enables a WTS 114 to provide a synchronized, continuously advancing point of progress back to the MTS 120, even if no transactions are currently being generated by the data source.

In order to process and filter data, both the WTSs 114 and the MTS 120 need access to metadata for each table that is captured. The simplest method for managing metadata (including different versions of metadata for the same table) across all WTSs 114 and MTS 120 is a single repository 118. The WTS and MTS processes retrieve metadata directly from the repository 118 or from a service affiliated with the repository. Before processing captured data, the repository imports all required metadata from the data source systems using a dedicated MTS service. In addition to the table metadata, the MTS 120 preserves at least the following trail metadata:

the locations of each TT and WTS, as well as their associations within the containing TTS, if any. Additional tracking may be done for:
location of redundant TT/WTS pairs for fault-tolerance,
redundant TT/WTS when one or more queries is already accessing a different set of TT/WTS's; and
information about the source environment.

To make the TDS highly available, the repository 118 should be replicated or at least frequently backed up.

Each WTS 114 returns the row operations to the MTS 120 that passed the specified FDS. Working under the assumption that the application may want to retrieve Other operations within the transaction, the WTS 114 returns the transaction begin read position in the TT that corresponded with this transaction. The position information is then passed to the WTS 114 for efficient positioning to retrieve the additional transaction data.

Augmentations to this strategy may include transaction caching mechanisms. For example:

if a row passes a filter, keep all other rows in the transaction affiliated with the filtered row in the cache;
if a row passes a filter, keep transactions occurring within a configured time range in the cache; and
optionally pass back the cached items to the MTS directly (the MTS cache) or keep cache in the WTS.

An embodiment of the invention supports reverse traversal based on time for both the WTS 114 and MTS 120. The CTR record contains the length of each record that enables reading in reverse order through the TT's by the WTS. When reading backwards, the MTS GDVN coordination mechanism must also be "reversed" to select the next "youngest" transaction available across all WTS's (rather than the next oldest). In addition, the minimum GDVN must be the stand-in mechanism (rather than the maximum observed GDVN) for those WTS's that do not have any remaining records.

Continuous read capability is a requirement of applications that process selected transactions as they occur on an ongoing basis. In this way, applications can specify a filter, and receive events that pass those filters, without terminating at the temporary ending point of the TTS. By doing so, applications avoid having to terminate the query, then initiating another query from the last transaction processed. Transactions can therefore continuously stream back to the user as if the query never reaches the end of data. The upper timestamp for a continuous query is not defined. For example, a user may require notification when frequency of a certain event exceeds a threshold within a 30 minute window. In this case, the system queries over continuously advancing 30 minute time windows for notification purposes.

Separating the WTS 114 and MTS 120 enables parallel disk access for a given query. This separation also reduces bandwidth requirements by filtering data before it travels across the network. As long as disk/WTS pairs do not share a communications channel with other disk/WTS pairs, the addition of each pair should have a near linear effect on the speed of a sequential search for transaction data, if the degree of selectivity is low. For example, if 1 million records are stored on disk A, and it takes 20 seconds to search all of those records (for a presumed result set of a few records), then splitting those same records across disks B and C should reduce the search time to 10 seconds (processing 500,000 records on each disk in parallel).

In addition, queries than run simultaneously, that also access the same data, can reduce contention and increase speed by accessing redundant copies of a given TT. The MTS 120, in conjunction with the repository 118, can make the determination at any given time about the optimal TT copy to access, based on which copies are already in use by a given query or session.

If the amount of data is relatively small, the typical time range involved in a query is narrow, or query response time is not an issue, a single TT may be sufficient. In this case, the MTS 120 and WTS 114 could be implemented together.

The TDS allows for distribution of transactions across multiple transaction trails to optimize query performance. The system enables the fastest possible query processing whether the specified time range (if any) is relatively small or large. One efficient implementation allows for a parameter based round robin policy that accepts a transaction trail set and distributes transactions across the trails that comprise the transaction trail set.

Transactional trail sets can also be duplicated for redundancy by the capture agents or could alternatively be maintained by a host based mirroring or storage subsystem. Note that redundant distribution can also serve to improve performance of simultaneous queries by reducing disk contention.

Data selected for capture can include any table in the source database, a subset of tables or even a subset of rows and columns. Typically, all tables, rows and columns are selected.

The following discussion is directed toward one implementation of the MTS/WTS processes. The MTS implementation can be compiled as a library that can be called by other applications. The MTS may implement all necessary WTS functions transparently to the caller.

Figure 5:
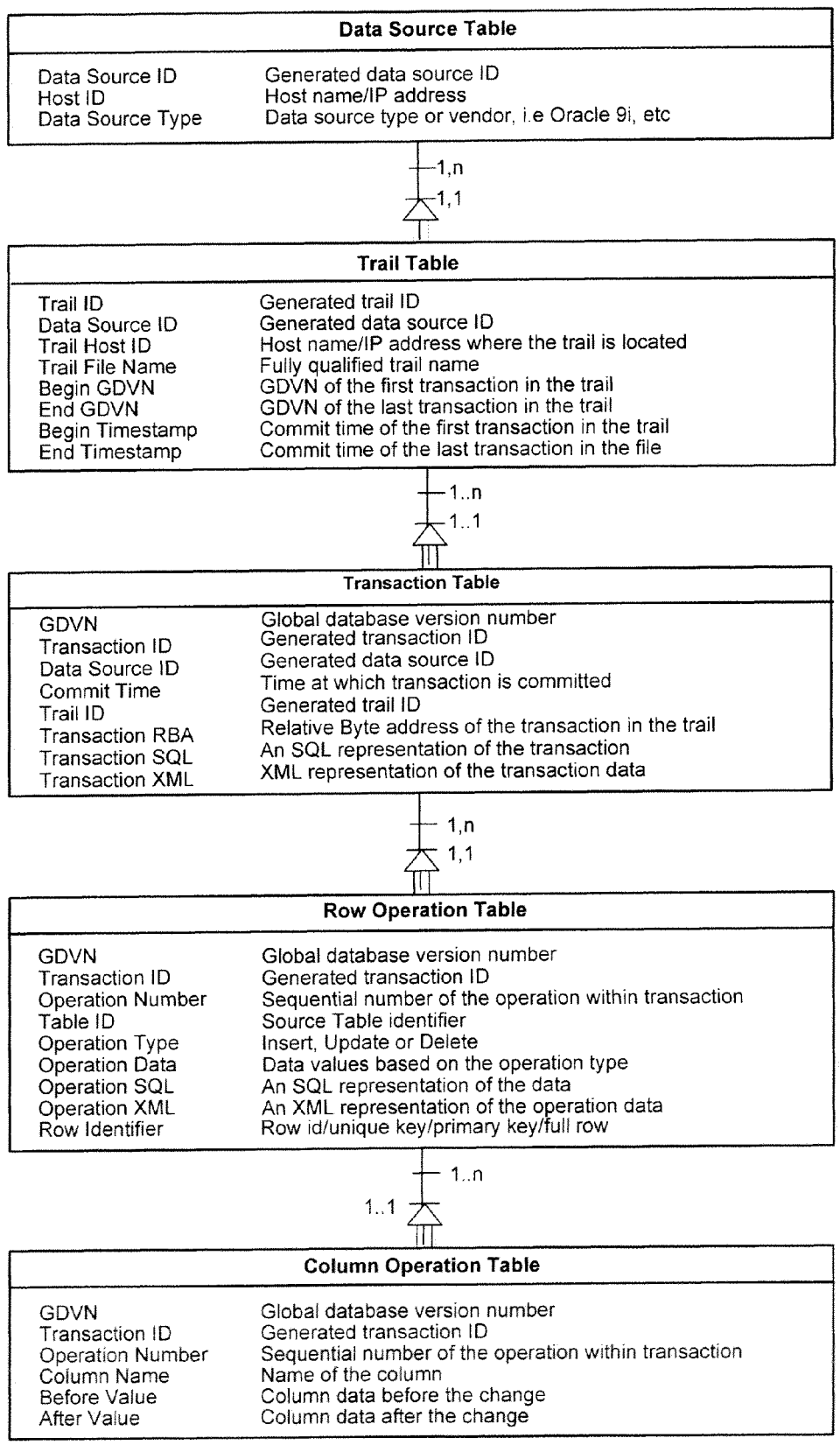
FIG. 5 illustrates a data model that represents a relational view of in memory tables of the underlying transaction data store in accordance with an embodiment of the invention.

The transaction data store user interface could be implemented as a relational database using any relational database management system, such as MYSQI FIG. 5 illustrates a data model that represents a relational view of in memory; tables of the underlying transaction data store. These virtual tables are implemented via a set of NITS APIs. The APIs are designed to be conforming to SQL standards in order to enable easy incorporation of a database front end via a plug in. Alternatively, the transaction data store could be accessed using the MTS APIs directly.

In one embodiment, functions supported by the MTS 120 include:
  InitQuery—passes in the filter and parameters for the query, The MTS determines whether or not to invoke various WTS processes to execute the query.
  GetNextRecord—returns the next record as specified by the query.
  Query Initialization Context
  Basic Parameters:
  list of data filters (see below);
  time range (may be infinite);
  read for more at the end-of-trail (continuous read);
  read forwards or backwards; and
  WTS read timeout (returns partial data buffers and current position from each WTS after this many seconds).
  Data Filters:
  Data source name;
  table name.
  operation type(s); and
  boolean expressions using column values, functions and comparison operators.

With respect to one implementation of the WTS 114, the GoldenGate capture program already provides the following functionality:
  read through GoldenGate transaction trails;
  filter for specific tables and rows within tables (using expressions and column functions):
  output selected data to trails and/or files, and flush it based on various parameters;
  read continuously; and
  a performance (efficient buffering; parallel read and write).

The GoldenGate Extract process can be adapted to act as a server for parent MTS processes. Extract is started in a new "service" mode. When in service mode. Extract performs differently in the following respects:
  Extract opens a designated port for communication with the parent MTS process;
  Extract receives parameters from the port (rather than a file);
  Extract passes back data on the port, rather than to a collector process for writing to the collector (this is done via a callback within the trail writing code); and
  there are no retry operations—if the connection is broken. Extract dies.

Those skilled in the art will appreciate that the invention may be implemented with a variety of optimizations. Tables that do not change frequently, but which need to be searched quickly, may be candidates for a different distribution strategy. In this scenario, such tables could be assigned to separate transaction trails than the rest of the data that changes more rapidly. For example, if 10 tables are tracked, changes to table T1 could be stored in TT(A), while changes to T2-T10 would be stored in TT(B).

The query processing engine would subsequently read these smaller trails. Therefore, a potentially much smaller amount of data would need to be read to satisfy a query. However, retrieving the remaining portion of the transaction would then require scanning through other trails sequentially (indexing back into those tables would be exceedingly complex).

Maintaining redundant copies of a given TT can also enable superior parallel query performance. Because multiple queries actively scanning the same set of data at the same time can cause disk head contention, providing a redundant TT enables simultaneous scans against the same data stream without disk contention.

Optimizations can be made according to the age of the data and its frequency of access. For example, if the transaction store in total keeps five years' worth of information, but the last year's information is queried twice as frequently as the prior years, then it may make sense to prune redundant copies that are more than a year old. In this case, if four copies of the data exist for the current year, then two copies should exist for prior years.

Figure 6:
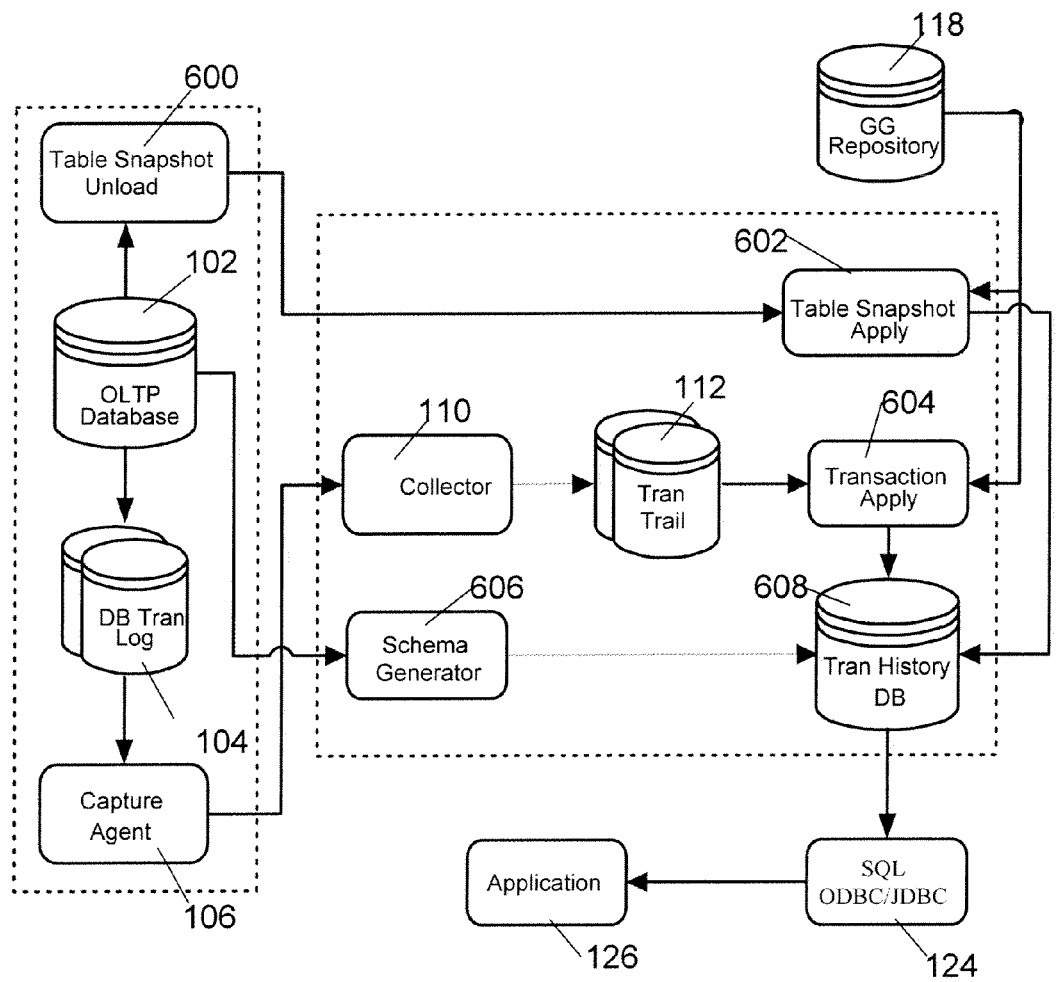
FIG. 6 illustrates an embodiment of the invention the constructs a transaction history database.

FIG. 6 illustrates an alternate embodiment of the invention, which includes many of the components of FIG. 1. However, in this embodiment, a table snapshot upload module 600 provides input to a table snapshot apply module 602. A transaction apply module 604 applies transactions from a transaction trail 112 to from a transaction history database (THDB) 608. The THDB 608 also receives input from a schema generator 606.

Thus, the techniques of the invention can be used to build a THDB 608. The most important distinction of the THDB 608 compared to the previously discussed transaction data store is that the THDB 608 stores a complete or selective history of changes captured from one or more production databases in separate, traditional relational database management systems. In addition, the history of changes to different tables and rows are also linked together in their original transaction context. The THDB 608 essentially makes a new copy of a record every time the production version of that record changes.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks. floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler and files containing higher code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium having stored thereon sets of instruction, which when executed by a computer, cause the computer to:

gather a first committed transactional record from a first transaction log associated with a first data source;

convert the first committed transactional record to a homogeneous format to form a first homogeneous transactional record with a common transaction record header containing transactional context information from the first data source, wherein the homogeneous format includes a common transaction record header, including at least three of the group consisting of: a transaction identification from the originating data source, the order and offset of a commit record from the originating data source transaction log, the original time of commit posting at the originating data source, the number of data source operations within the common transaction record, and the number of bytes occupied by the common transaction record on disk;

gather a second committed transactional record from a second transaction log associated with a second data source with a format different than the first data source;

convert the second committed transactional record to the homogeneous format to form a second homogeneous transactional record with a common transaction record header containing transactional context information from the second data source; and combine the first homogeneous transactional record with the second homogeneous transactional record to form a new common homogeneous transaction record format in a data store that is independent of a source format of the first data source or the second data source.

2. The computer readable storage medium of claim 1 wherein the homogeneous transaction data store is distributed across a set of files containing committed transactions in historical order.

3. The computer readable storage medium of claim 1, wherein the sets of instructions when further executed by the computer, cause the computer to query the homogeneous transaction data store.

4. The computer readable storage medium of claim 1, wherein the sets of instructions when further executed by the computer, cause the computer to assess from the homogeneous transaction data store temporal data access.

5. The computer readable storage medium of claim 1, wherein the sets of instructions when further executed by the computer, cause the computer to assess from the homogeneous transaction data store data compliance.

6. The computer readable storage medium of claim 1, wherein the sets of instructions when further executed by the computer, cause the computer to assess from the homogeneous transaction data store fraud.

7. The computer readable storage medium of claim 1, wherein the sets of instructions when further executed by the computer, cause the computer to assess from the homogeneous transaction data store audit information.

8. The computer readable storage medium of claim 1, wherein the sets of instructions when further executed by the computer, cause the computer to define capture agents to form the first homogeneous transaction record and the second homogeneous transaction record.

9. The computer readable storage medium of claim 8 wherein the capture agents identify incremental transactional changes from database transaction logs.

10. The computer readable storage medium of claim 8 wherein the capture agents form a sequence of transaction files.

11. The computer readable storage medium of claim 8 wherein the capture agents identify incremental transactional changes from a data extraction process.

12. The computer readable storage medium of claim 8 wherein the capture agents use application program interfaces to facilitate access to custom data sources.

13. The computer readable storage medium of claim 1, wherein the sets of instructions when further executed by the computer, cause the computer to partition the homogeneous transaction data store across multiple transaction trails and disks.

14. The computer readable storage medium of claim 1, wherein the sets of instructions when further executed by the computer, cause the computer to utilize a heartbeat mechanism to order records across transaction trails.

15. The computer readable storage medium of claim 1, wherein the sets of instructions when further executed by the computer, cause the computer to partition the homogeneous transaction data store according to table name.

16. The computer readable storage medium of claim 8 wherein the capture agents maintain redundant trail copies with a trail directory to facilitate scalability and fault tolerance.

17. The computer readable storage medium of claim 8 wherein the capture agents form transaction trail headers.

18. The computer readable storage medium of claim 17 wherein the transaction trail headers include:
   a source host identifier;
   information specifying a timestamp-range representing the time span of all committed records within the transaction trail;
   information specifying the first and last committed transactions within the transaction trail; and
   a trail sequence number.

19. The computer readable storage medium of claim 1, wherein the sets of instructions when further executed by the computer, cause the computer to process the homogeneous transaction data store across a master trail server and worker trail servers to facilitate disk read parallelism and filter processing.

20. The computer readable storage medium of claim 1, wherein the sets of instructions when further executed by the computer, cause the computer to repeatedly apply a single structure query language query against a sequence of transactions in a transaction trail.

* * * * *

UNITED STATES PATENT AND TRADEMARK OFFICE
CERTIFICATE OF CORRECTION

| | | |
|---|---|---|
| PATENT NO. | : 7,831,574 B2 | Page 1 of 2 |
| APPLICATION NO. | : 11/747848 | |
| DATED | : November 9, 2010 | |
| INVENTOR(S) | : Alok Pareek et al. | |

It is certified that error appears in the above-identified patent and that said Letters Patent is hereby corrected as shown below:

On the first page, in field (57), in column 2, in "Abstract", line 2, after "gather" insert -- a --.

In column 1, line 35, after "de-normalized" insert -- , --.

In column 1, line 48, delete "worth)." and insert -- worth), --, therefor.

In column 2, line 11, delete "respect to) ,he" and insert -- respect to the --, therefor.

In column 4, line 55, delete "(e.g." and insert -- (e.g., --, therefor.

In column 4, line 55, delete "IBM." and insert -- IBM, --, therefor.

In column 4, line 56, delete "instance," and insert -- instance. --, therefor.

In column 5, line 1, delete "106," and insert -- 106. --, therefor.

In column 5, line 50, delete "lo" and insert -- to --, therefor.

In column 5, line 61, delete "their" and insert -- that --, therefor.

In column 6, line 13, delete "system" and insert -- system, --, therefor.

In column 6, line 34, delete "he" and insert -- be --, therefor.

In column 6, line 48, delete "insufficient.," and insert -- insufficient, --, therefor.

In column 7, line 10, delete "deletes)." and insert -- deletes), --, therefor.

In column 7, line 25, delete "of/dirpath/bb." and insert -- of /dirpath/bb. --, therefor.

Signed and Sealed this
Second Day of August, 2011

David J. Kappos
*Director of the United States Patent and Trademark Office*

CERTIFICATE OF CORRECTION (continued)
U.S. Pat. No. 7,831,574 B2

In column 8, line 23, delete "agent," and insert -- agent. --, therefor.

In column 9, line 16, delete "timestamp." and insert -- timestamps. --, therefor.

In column 9, line 45, delete "NITS" and insert -- MTS --, therefor.

In column 9, line 55, delete "mist" and insert -- must --, therefor.

In column 10, line 9, delete "tolerance," and insert -- tolerance; --, therefor.

In column 10, line 18, delete "Other" and insert -- other --, therefor.

In column 11, line 38, delete "MYSQI" and insert -- MYSQL. --, therefor.

In column 11, line 39, delete "memory;" and insert -- memory --, therefor.

In column 11, line 41, delete "NITS" and insert -- MTS --, therefor.

In column 11, line 49, delete "query," and insert -- query. --, therefor.

In column 11, line 64, delete "name." and insert -- name; --, therefor.

In column 12, line 10, delete "a performance" and insert -- performance --, therefor.

In column 12, line 13, delete "mode." and insert -- mode, --, therefor.

In column 13, line 14, delete "disks." and insert -- disks, --, therefor.

In column 13, line 22, delete "compiler" and insert -- compiler, --, therefor.

In column 13, line 22, delete "higher" and insert -- higher-level --, therefor.